United States Patent [19]

Carmichael et al.

[11] Patent Number: 4,485,912

[45] Date of Patent: Dec. 4, 1984

[54] ARTICLE ALIGNMENT AND CONVEYING APPARATUS

[75] Inventors: D. Murphy Carmichael; Walter L. Davis, both of Milton-Freewater, Oreg.; Vernon L. Perry, Walla Walla, Wash.

[73] Assignee: Key Electrosonic Corporation, Milton-Freewater, Oreg.

[21] Appl. No.: 383,752

[22] Filed: Jun. 1, 1982

[51] Int. Cl.³ .............................................. B65G 47/24
[52] U.S. Cl. ..................................... 198/382; 198/445
[58] Field of Search ............... 198/382, 446, 396, 817, 198/445, 383, 389, 840, 399

[56] References Cited

U.S. PATENT DOCUMENTS

| | | | |
|---|---|---|---|
| 1,192,832 | 7/1916 | Sherman | 198/817 |
| 1,905,700 | 4/1933 | Greenholt | 198/399 |
| 2,456,031 | 12/1948 | Spain | 198/446 |
| 2,764,274 | 9/1956 | Griswold et al. | 198/389 |
| 3,180,476 | 4/1965 | Marasso et al. | 198/399 |
| 3,545,588 | 12/1970 | Corley | 198/817 |
| 3,572,492 | 3/1971 | Dreszig | 198/446 |
| 3,623,592 | 11/1971 | Anderson | 198/446 |
| 3,653,509 | 4/1972 | Goodman, Jr. | 198/817 |
| 4,011,939 | 3/1977 | Conrad | 198/840 |
| 4,302,002 | 11/1981 | Hashimoto | 198/817 |

FOREIGN PATENT DOCUMENTS

742874  1/1956  United Kingdom ............... 198/396

Primary Examiner—Joseph E. Valenza
Assistant Examiner—Daniel R. Alexander
Attorney, Agent, or Firm—Wells, St. John & Roberts

[57] ABSTRACT

An article alignment and conveying apparatus 10 is described for aligning elongated articles 12 in single file in a plurality of transversely spaced lanes and moving the articles while in the lanes past a work station 13. The apparatus 10 includes an article feed bed in the form of a series of stepped conveyor beds 20 for receiving the articles and subdividing the articles into a number of channels 32 corresponding with the lanes. The articles fall from the channels 32 onto a belt conveyor 40 having a plurality of parallel narrow belts extending from the channels 32 past the work station. The belt conveyor 40 has a grooved bed section for corrugating the surface formed by the belts to transversely space and longitudinally align the articles. The belt conveyor 40 has a second bed section that is flat to flatten the supporting surface of the belt as the aligned articles moved past the work station 13.

13 Claims, 12 Drawing Figures

ARTICLE ALIGNMENT AND CONVEYING APPARATUS

TECHNICAL FIELD

This invention relates to article alignment and conveying apparatus for aligning elongated articles in single file in a plurality of transversely spaced lanes and moving the articles while in the lanes past a work station.

BACKGROUND OF THE INVENTION

In high volume handling of elongated articles such as "french fries" and the like it is desirable to rapidly and economically identify those articles or french fries that have undesirable characteristics and to separate the undesirable articles from the desirable articles. However, it is very expensive and frequently uneconomical to hand inspect and remove articles as they flow on a moving belt.

One of the objects of this invention is to provide a very efficient high volume mechanism for accurately aligning the articles in a longitudinal direction in a plurality of spaced lanes so that a large volume of articles may be processed by automatic equipment.

An additional object of this invention is to provide an article alignment and conveying apparatus that is capable of being rapidly and efficiently adjusted to handle more than one size of product.

These and other objects and advantages of this invention will become apparent upon reading the following detailed description of a preferred embodiment.

BRIEF DESCRIPTION OF THE DRAWINGS

A preferred and alternate embodiment of this invention is illustrated in the accompanying drawings, in which.

DETAILED DESCRIPTION OF A PREFERRED EMBODIMENT

The following disclosure is submitted in compliance with the purpose of the U.S. constitution "to promote the progress of science and useful arts" (Article I, Section 8).

Figure 1:
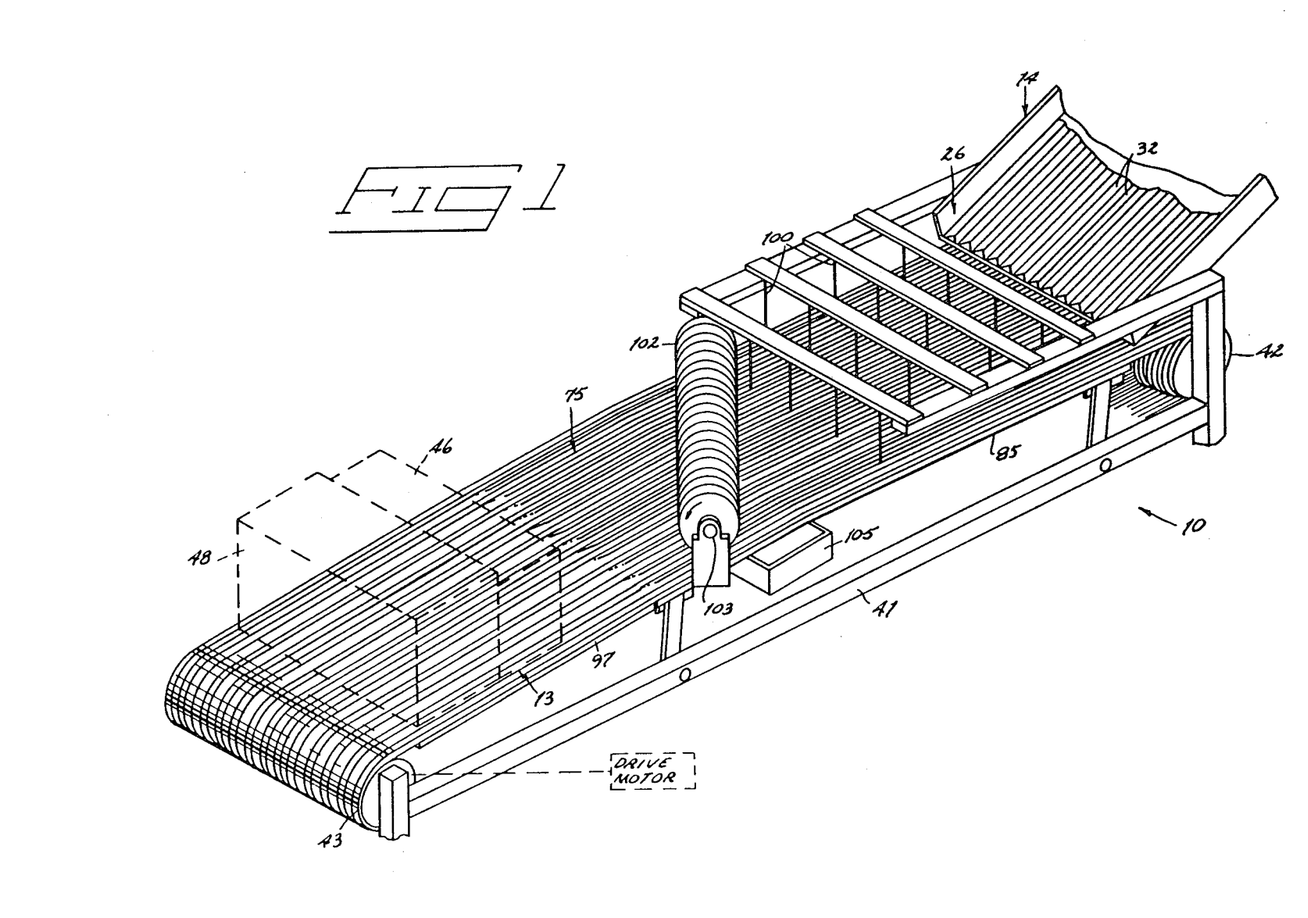
FIG. 1 is an isometric view of the article alignment and conveying apparatus which is the subject of the present invention.

Referring now in detail to the drawings there is illustrated in FIG. 1 an article alignment and conveying apparatus generally designated with the numeral 10 for conveying elongated articles 12 past a work station 13 in which the articles 12 are aligned in single file in a plurality of transversely spaced lanes as the articles move past a work station. The articles 12 are preferably elongated potato sections referred to as "french fries". Other similar articles may be processed by apparatus 10.

The objective of the apparatus is to be able to handle a large volume of french fries and to align the french fries very accurately with respect to the lanes as they pass the work station 13 so that very accurate, large volume processing of the articles can be accomplished. Generally automatic inspection equipment 46 is located at the work station 13. Additionally a selective article treatment device 48 may also be positioned at or near the work station 13 for removing or treating undesirable articles.

The apparatus 10 includes an article feed means 14 for initially receiving the elongated articles 12 generally in an unseparated or jumbled mass at a receiving section 22 and for separating the articles into a plurality of channels 32 corresponding to transversely spaced lanes and discharging the articles 12 onto an elongated belt conveyor 40.

Figure 3:
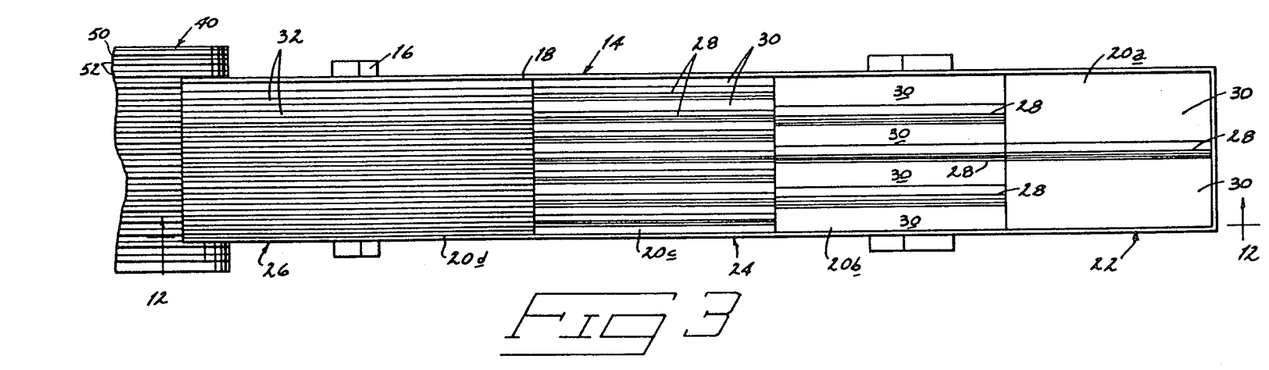
FIG. 3 is a top view of an article feed means including conveying beds for initially receiving and separating the articles into channels.
Figure 12:
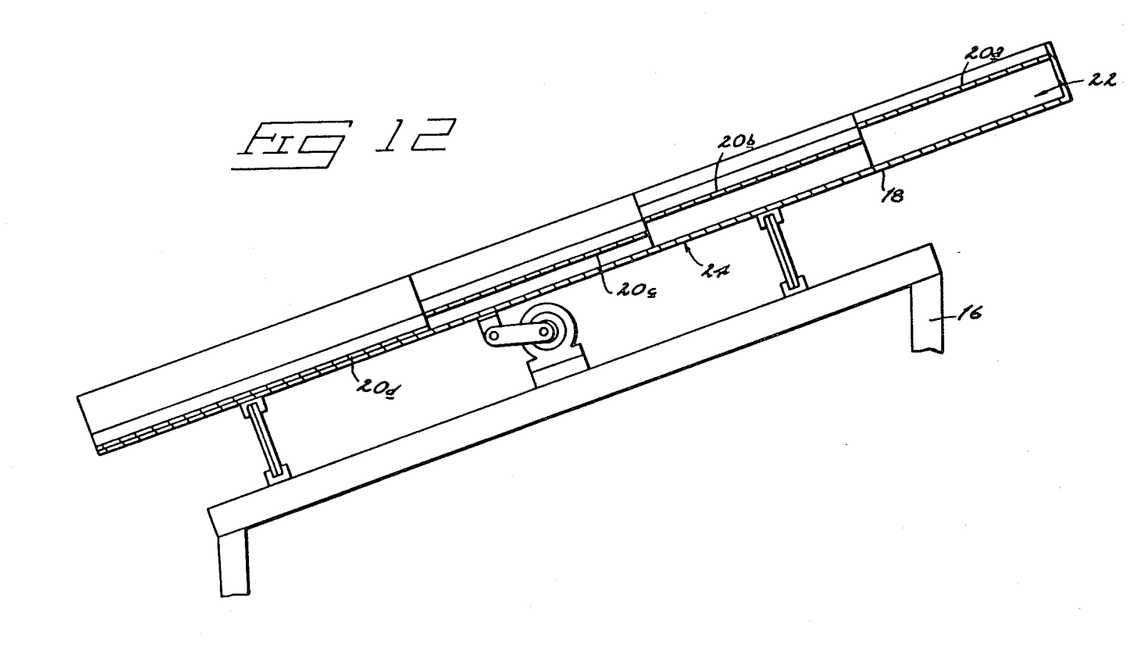
FIG. 12 is a side elevational view of the article feed means illustrated in FIG. 3.

The article feed means 14 includes a support framework 16 (FIGS. 3 and 12) for supporting a vibratory conveying bed frame 18 at an elevated inclined orientation with a plurality of stepped vibratory beds 20a, 20b, 20c, and 20d for progressively separating and spreading the articles 12. At the upper end of the bed frame 18, the vibratory bed 20a forms a receiving station 22 for initially receiving the articles 13 from some type of random article feed. As the articles 12 are vibrated down the stepped beds 20a–d, the articles progress through a separation station 24 formed by the step beds 20a, 20b, 20c, and 20d with the last step bed 20d forming a discharge section 26 for discharging the articles from channels 32 onto the elongated belt conveyor 40. Each of the stepped beds 20a–d include one or more dividers 28 and troughs 30 (FIG. 3). The number of dividers and troughs 28 and 30 respectively progressively increase from one stepped bed 20a–d to another to progressively subdivide the articles into narrower troughs 28.

Bed 20d is formed by V-shaped channels 32 that form both the troughs 30 and the dividers 28. The channels 32 correspond with the lanes that extend to pass the work station 13. Additional stepped beds or stages may be provided as needed.

The elongated belt conveyor 40 extends from the discharge section 26 of the article feed means 14 past the work station 13 for further aligning the product longitudinally and registering the articles with respect to the lanes and to prevent the articles from moving laterally as the articles are being transferred from the discharge section 26 to the elongated belt conveyor 40. The elongated belt conveyor 40 includes a framework 41 that extends from a receiving end 42 to a discharge end 43.

The elongated belt conveyor includes a first set of narrow belts 50 and a second set of narrow belts 52 (FIGS. 6-11) that are placed in parallel abutting relationship alternately across the conveyor 40 to form a wide article support surface 75 extending from the receiving end 42 to the discharge end 43. The belts 50 and 52 are each formed of continuous plastic material that is somewhat lengthwise stretchable and having smooth surfaces. The elongated belt conveyor 40 includes drive means having a front pulley drum 55 adjacent the receiving end 42 and a rear pulley drum 57 adjacent the discharge end 43 for stretchably receiving the alternating narrow belts 50 and 52. The narrow belts 50 and 52 are illustrated in cross sections in FIGS. 6-11. Each narrow belt 50 and 52 is preferably of rectangular cross section which includes an upper surface, a lower surface and side surfaces. The surfaces of belts 50 and 52 are quite smooth enabling one belt to easily slide vertically with respect to the other belt. The narrow belt 52 has an inverted U-shaped groove 71 formed therein. The upper surfaces of the belts 50 and 52 cooperatively form a wide article conveying belt surface 75 that extends from the receiving end 42 to the discharge end 43 for carrying the articles past the work station 13.

Figure 8:
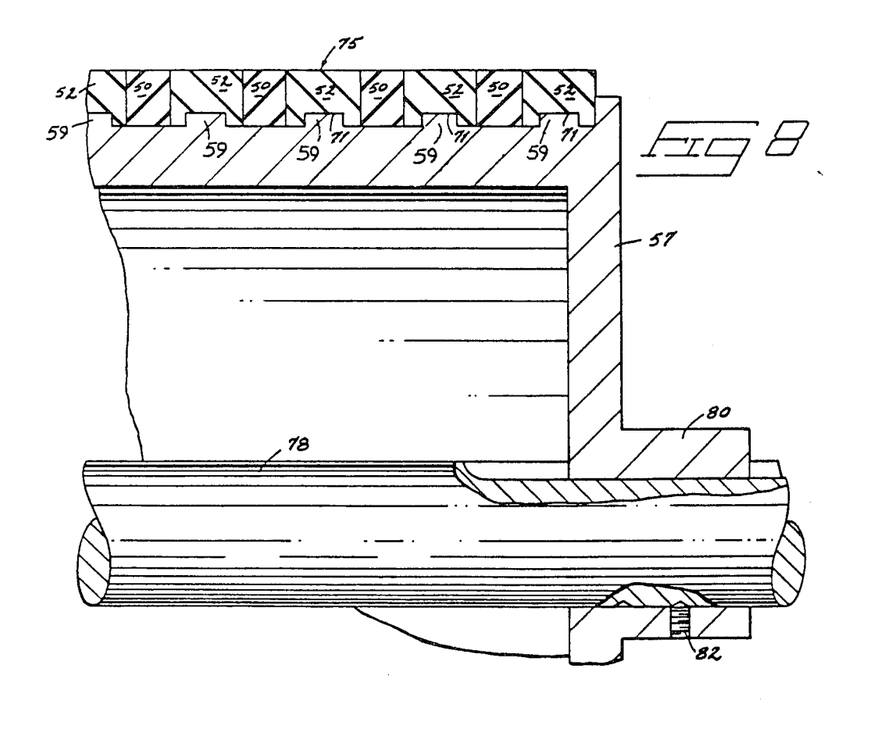
FIG. 8 is a vertical cross-sectional view through a drive shaft for the belt conveyor illustrating the configuration of a belt drum for driving the narrow belts.
Figure 9:
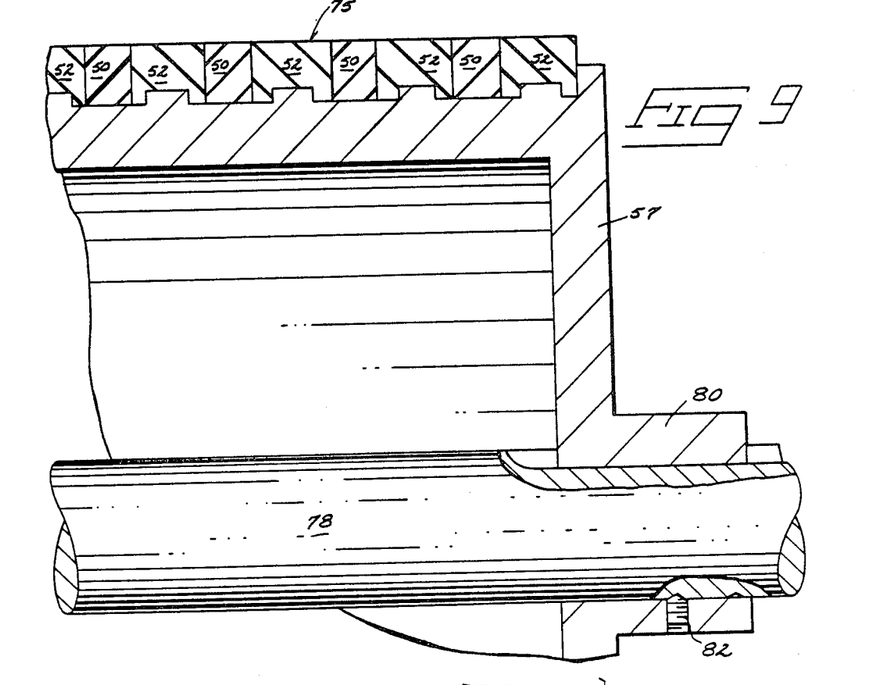
FIG. 9 is a view similar to FIG. 8 except showing a drum portion of the drive adjusted laterally one increment to move the belts with respect to the bed sections.

The pulley drums 55 and 57 include spaced annular pulley ribs 59 that are illustrated in FIGS. 1, 8 and 9 that have widths that are complementary and project into the groove 71 of the narrow belts 52. The pulley drums 55 and 57 are mounted on shafts 78 with end hubs 80 that are slidably mounted on the shafts to enable the drums 55 and 57 to be moved axially along the shaft 78 to shift the belts 50 and 52 laterally with respect to the longitudinal direction of the conveyor 40. A set screw 82 is provided in the hubs 80 to affix the drums 50 and 57 at one of two lateral positions. The adjustable pulley drums 55 and 57 enable the belts to be shifted laterally in unison as desired by releasing and resetting the set screw 82 in one of the two lateral positions.

Figure 2:
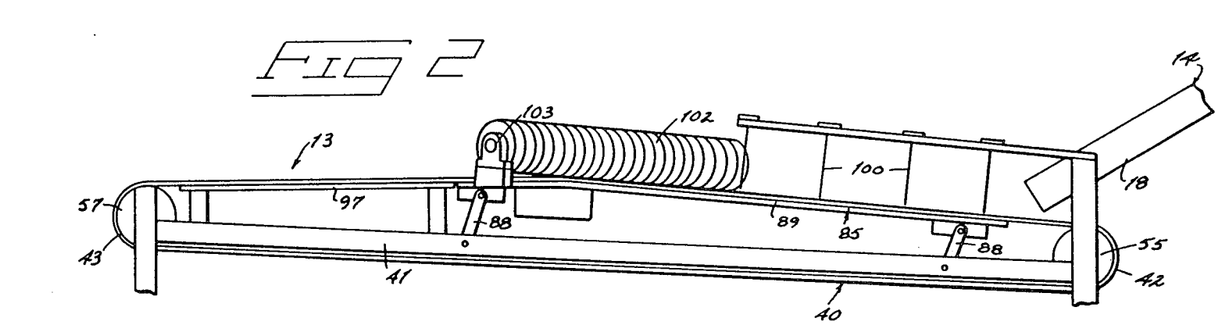
FIG. 2 is a side elevational view of an elongated belt conveyor which forms a major portion of the invention.

The elongated belt conveyor 40 further includes a first bed section 85 (FIGS. 1, 2 and 5) for receiving and slidably supporting the narrow belts 50 and 52 adjacent the receiving end 42. The first bed section 85 includes a subframe that is pivotally mounted through pivots 88 to enable the subframe to be pivoted to an upward operative condition (FIG. 2) in which an upper plate 89 of the bed section 85 engages and lifts the narrow belts 50 and 52 and a lower position (FIG. 5) to enable the belts to be moved laterally.

Figure 6:
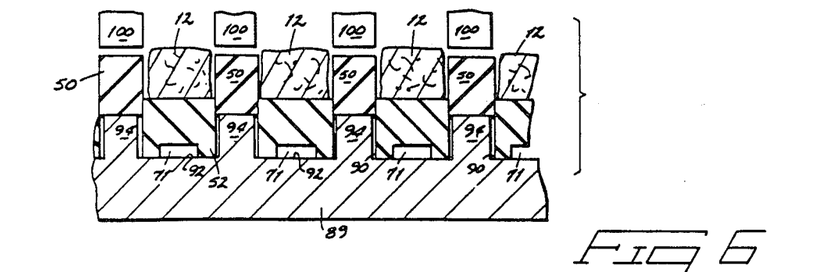
FIG. 6 is a vertical cross sectional view taken along the line 6—6 in FIG. 4 showing a first bed section of the belt conveyor illustrating the bed having grooves for supporting narrow belts at varying elevations to form a corrugated belt surface.
Figure 7:
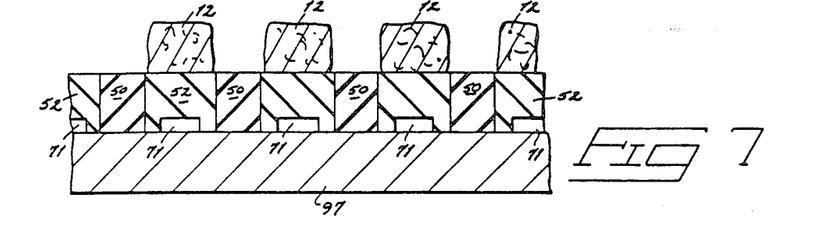
FIG. 7 is a vertical cross-sectional view taken along line 7—7 in FIG. 4 illustrating a second bed section at the work station in which the narrow belts are at the same elevation to provide a flat article support surface.
Figure 10:
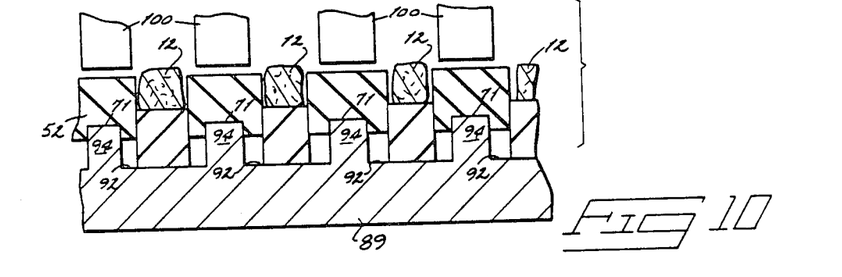
FIG. 10 is similar to FIG. 6 except showing the location of the narrow belts with respect to the first bed section for handling a different size article.
Figure 11:
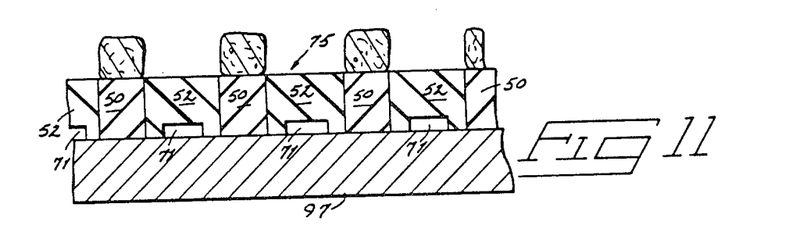
FIG. 11 is a vertical cross-sectional view similar to FIG. 7 illustrating the position of the elongated articles as the articles move over the second bed section.

The upper plate 89 has a plurality of parallel longitudinal grooves formed therein to define valleys 92 and ridges 94 (FIGS. 6 and 10). Both the valleys 92 and ridges 94 are designed to slidably support the narrow belts 50 and 52 in which the wide article conveying surface 75 is corrugated along the first bed section 85 so that the articles 12 are aligned longitudinally in the valleys 92 as illustrated in FIG. 6. In FIG. 6 the narrow belts 52 are slidably mounted in the valleys 92 and the narrow belts 50 are slidably mounted on the ridges 94. Near a forward end of the first bed section 85, the ridges 94 taper to the valleys 92 so that the upper surfaces of the belts 50 and 52 form a flat article support surface 75 as illustrated in FIGS. 7 and 11 as the articles are moved past the work station 13.

As the article drops off the discharge end 26 of the article feed means 14, the articles are quite active and still vibrating. The valleys 92 are aligned with the channels 32 so that the articles 13 sequentially fall in line into the valleys 92. The narrow belts on the ridge 94 project upward confining the articles to prevent the articles from moving laterally and to register the articles with respect to the lanes so that the articles move past the work station with a high degree of precision with respect to their transverse spacing and longitudinal orientation.

The elongated belt conveyor 40 further includes a second bed section 97 (FIGS. 1, 2, 5, 7 and 11) that is immediately downstream of the first bed section 85 for receiving and supporting the narrow belts 50 and 52 in which the belts are supported so that their upper surfaces form the substantially flat conveying surface 75 with the articles precisely aligned and spaced as they move past the work station 13.

The apparatus 10 is designed so that the belts 50 and 52 may be shifted laterally with respect to the first bed section 85 so that either the narrow belts 50 or the narrow belts 52 will ride in the valleys 92. In FIG. 6, the narrow belts 52 ride in the valleys 92 whereas in FIG. 10, the narrow belts 50 ride in the valleys 92. You will note that in FIG. 10, the narrow belts 52 ride on the ridges 94 with the ridges 94 projecting into the belt grooves 71. The lateral shift is accomplished by releasing the set screws 82 and moving the pulley drums 55 and 57 laterally on the shafts 78 and then resetting the set screws 82.

In a preferred embodiment, the narrow belt 52 is wider than the narrow belt 50 so that the apparatus can be utilized for two different width lanes. In one application, the narrow belt 52 is ⅜" wide and the narrow belt 50 is ⅜" wide. Under such a condition, french fries of approximately ¼" thickness will ride in the valleys 92 as illustrated in FIG. 6 whereas in FIG. 10 french fries of approximately ¼" will reside in the valleys 92.

While riding over the first bed section 85, the elongated articles are registered laterally and stabilized and aligned longitudinally to the lanes. As the belts move in unison toward the second bed section 97, the raised belts are progressively lowered so that as the belts pass over the second bed section 97 the upper surfaces of the belts 50 and 52 are substantially coincident forming the flat conveying surface 95 (FIGS. 7 and 11).

Figures 4, 5:
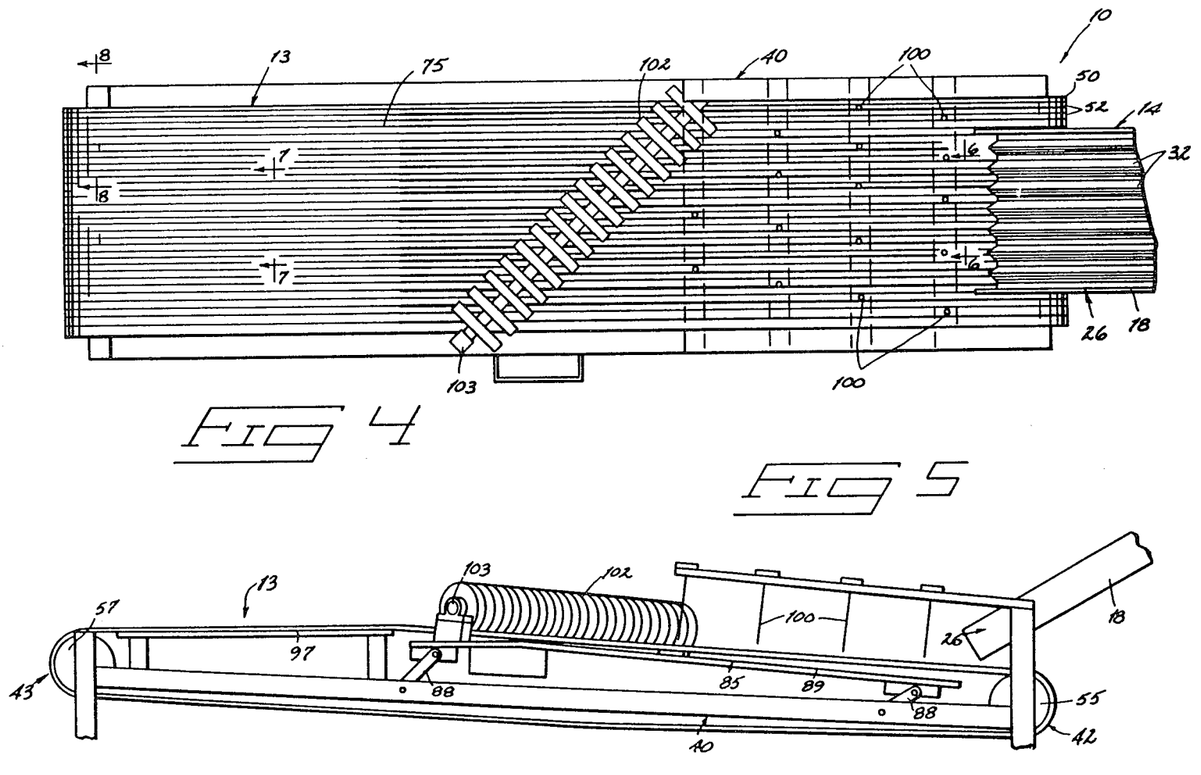
FIG. 4 is a top view of the elongated belt conveyor illustrated in FIG. 2.
FIG. 5 is a side elevational view similar to FIG. 2 except showing a first bed section lowered to adjust the transverse portion of the belts.

The elongated belt conveyor 40 further includes an overhead frame 98 (FIGS. 1, 2 and 5) that extends over the first bed section 85. The overhead frame has a plurality of fingers 100 that extend downward over the ridges 94 to deflect any crosswise oriented elongated articles into the valleys 92. The fingers 100 are staggered in diagonal rows as illustrated in FIG. 4 so as to maximize the opportunity for a crosswise oriented article to be deflected into a valley 92.

Downstream of the fingers 100, a transverse brush 102 is mounted at approximately 45° with respect to the longitudinal movement of the narrow belts 50, 52 for transversely moving any crosswise articles or piggyback articles laterally across the surface 75 and hopefully into an unfilled valley 92. The brush 102 is journalled in journal bearings 103 on opposite sides of the bed and is rotated counterclockwise as shown in FIG. 1 to brush the piggyback or crosswise articles across the corrugated conveying surface 75. If the articles do not fall into an unfilled valley 92 as they progress across the surface 75, then they are deflected into a recovery container 105 (FIG. 1) along one side of the elongated belt conveyor 40.

In compliance with the patent law statutes, the invention has been described in language more or less specific as to structural features. It is to be understood, however, that the invention is not limited to the specific features shown, since the means and construction thereof disclosed comprise a preferred form of putting the invention into effect, the invention is, therefore, claimed in any of its forms or modifications within the proper scope of the following claims, particularly interpreted in accordance with the doctrine of equivalents.

We claim:

1. Article alignment and conveying apparatus for conveying elongated articles past a work station in which the articles are aligned in single file in a plurality of transversely spaced lanes and then moved longitudinally past the work station, in which the articles have a prescribed maximum cross-sectional dimension, comprising:

an article feed means upstream of the work station for successively feeding the articles;

an elongated belt conveyor extending in the longitudinal direction from the article feed means past the work station;

said conveyor having a plurality of movable elongated narrow belts extending from the article feed means past the work station in continuous engaging parallel relationship forming a resultant wide movable continuous article conveying surface for receiving the articles from the discharge section and moving the articles single file past the work station in the plurality of transversely spaced lanes;

said belt conveyor having a first bed section for slidably supporting the plurality of narrow belts adjacent the article feed means in which the first bed section has a plurality of laterally spaced longitudinal grooves defining valleys and adjacent ridges to slidably elevate respective narrow belts on the ridges to corrugate the wide movable continuous article conveying surface as the narrow belts move over the first bed section with the belts in the valleys defining the lanes and receiving the articles from the article feed means and longitudinally aligning the articles in the lanes between the narrow belts on the ridges;

said valleys having a defined valley width and said ridges having a defined ridge width;

said belt conveyor having a second bed section at the work station for slidably supporting the narrow belts downstream of the first bed section with the wide movable article conveying surface being relatively flat; and drive means operatively connected to the elongated narrow belts for slidably moving the narrow belts in unison over the first and second bed sections with the wide article conveying surface changing from a corrugated contour to a substantially flat contour to initially successively receive the articles from the article feed means and form the articles into single files on the narrow belts in the valleys confined by the moving narrow belts on the ridges to register the articles in the lanes and to prevent transverse movement of the articles as the articles are moved toward the work station and for moving the articles in the lanes past the work station with the contour of the wide article transport surface substantially flat.

2. The article alignment and conveying apparatus as defined in claim 1 wherein the drive means includes two transverse drum pulleys at opposite ends of the belt conveyor for moving the narrow belts in unison over the first and second bed sections; wherein the drum pulleys have a series of annular pulley ribs thereon spaced transversely along the drum corresponding to the width of the valleys in which the annular pulley ribs have widths corresponding to the widths of the ridges.

3. The article alignment and conveying apparatus as defined in claim 1 wherein the narrow belts riding in the valleys have widths related to the maximum cross-sectional dimension of the article to prevent more than one article from entering the valleys at any longitudinal lane location.

4. The article alignment and conveying apparatus as defined in claim 2 wherein the narrow belts include two sets of narrow belts that are alternately positioned across the width of the transfer surface, and wherein the width of the narrow belts of one set is greater than the width of the other set and wherein the widths of the wider belts correspond with the widths of the valleys and the widths of narrower belts correspond with the widths of the pulley ribs.

5. The article alignment and conveying apparatus as defined in claim 4 wherein the one set of narrow belts has grooves formed in a bottom surface thereof in which the width of the grooves corresponds with the widths of the pulley ribs.

6. The article alignment and conveying apparatus as defined in claim 5 wherein the drum pulleys and the first bed are transversely movable with respect to each other to shift the belts with respect to the first bed to position either the set of wider belts or the set of narrower belts in the valleys to form two different width lanes.

7. The article alignment and conveying apparatus as defined in claim 5 wherein the one set of narrow belts is supported on the drum pulleys with the ribs projecting into the belt grooves and rides on the ridges of the first bed section; wherein the other set of narrow belts is supported on the drums between the drum ribs and rides on the valleys of the first bed section.

8. The article alignment and conveying apparatus as defined in claim 1 wherein the article feed means includes a series of stepped vibratory conveying beds extending from a receiving section to a discharge section in which vibratory conveying beds have a progressively increasing number of dividers for successively moving the articles over the vibratory conveying beds and successively dividing the articles into a plurality of channels.

9. The article alignment and conveying apparatus as defined in claim 8 wherein each vibratory conveying bed includes a divider centrally aligned with respect to each channel of the immediately preceding bed for successively subdividing the articles from the immediately preceding bed into at least twice as many subgroups.

10. The article alignment and conveying apparatus as defined in claim 8 wherein many of the dividers are inverted "V" shaped to longitudinally align the articles as the articles are separated by the divider.

11. The article alignment and conveying apparatus as defined in claim 8 wherein the series of stepped vibratory conveying beds are mounted on a single frame and wherein the article feed means includes a vibratory drive means operatively connected to the single frame for vibrating the beds in unison.

12. The article alignment and conveying apparatus as defined in claim 8 wherein each of the vibratory conveying beds are inclined downward from the preceding bed to the succeeding bed.

13. The article alignment and conveying apparatus as defined in claim 12 wherein each of the vibratory conveying beds is corrugated with each succeeding bed having a progressively increasing number of corrugations to progressively subdivide the articles as the articles progressively move from one inclined bed to the next.

* * * * *